United States Patent [19]
Horikoshi et al.

[11] 4,376,369
[45] Mar. 15, 1983

[54] DEVICE FOR CONTROLLING PRIMARY AND SECONDARY AIR/FUEL RATIOS FOR INTERNAL COMBUSTION ENGINE

[75] Inventors: Masafumi Horikoshi; Michikatsu Sato; Takanori Onishi, all of Toyota, Japan

[73] Assignee: Toyota Jidosha Kogyo Kabushiki Kaisha, Aichi, Japan

[21] Appl. No.: 198,663

[22] Filed: Oct. 20, 1980

[30] Foreign Application Priority Data

Feb. 22, 1980 [JP] Japan .................................. 55-21869

[51] Int. Cl.³ .......................... F02N 3/22; F02B 75/10
[52] U.S. Cl. ........................................ 60/276; 60/285; 60/290; 123/440
[58] Field of Search ............... 60/276, 289, 285, 290; 123/440, 438

[56] References Cited

U.S. PATENT DOCUMENTS

| | | | |
|---|---|---|---|
| 3,832,848 | 9/1974 | Scholl | 60/289 |
| 3,962,867 | 6/1976 | Ikeura | 60/290 |
| 4,148,188 | 4/1979 | Tokura | 60/289 |
| 4,149,376 | 4/1979 | Masaki | 60/285 |
| 4,233,811 | 11/1980 | Masaki | 60/289 |
| 4,276,745 | 7/1981 | Takada | 60/289 |

FOREIGN PATENT DOCUMENTS

54-5119 1/1979 Japan .................................. 60/290
54-155311 12/1979 Japan .................................. 60/290

Primary Examiner—Douglas Hart
Attorney, Agent, or Firm—Stevens, Davis, Miller & Mosher

[57] ABSTRACT

An internal combustion engine has an exhaust manifold, an inlet manifold, and a carburetor which has a fuel jet. An oxygen sensor is mounted within the exhaust manifold, and produces an output signal according to the oxygen present within the exhaust gases. A computing means computes a corrective signal according to the oxygen sensor output signal. This corrective signal is fed as an input signal both to a means for supplying secondary air into the exhaust manifold, and also to a means for supplying bleed air to the jet of the carburetor. In a particular embodiment, a secondary air signal cutoff device selectively intercepts supply of the corrective signal to the secondary air supply means, and an air bleed signal cutoff device selectively intercepts the supply of the corrective signal to the air bleed supply means. These cutoff devices may be controlled according to vehicle road speed, engine temperature, engine rotational speed, inlet manifold vacuum, and the temperature of a catalytic converter. The corrective signal may be a duty ratio coded pulse signal.

4 Claims, 3 Drawing Figures

DEVICE FOR CONTROLLING PRIMARY AND SECONDARY AIR/FUEL RATIOS FOR INTERNAL COMBUSTION ENGINE

BACKGROUND OF THE INVENTION

The present invention relates to an air/fuel ratio control system for an internal combustion engine, and, in particular, relates to an air/fuel ratio control system for an internal combustion engine which is supplied with air-fuel mixture by a carburetor.

For purifying the exhaust gases emitted by an internal combustion engine of noxious components contained therein, such as HC, CO, NOx, simultaneously, there is known a 3-way catalytic converter, which is capable of reducing the amounts of unburnt hydrocarbons, and also the amounts of nitrous oxides, simultaneously. However, for an engine provided with such a 3-way catalytic converter, in order for the 3-way operation of the convert to proceed properly, it is necessary to control the air/fuel ratio of the exhaust gases of the engine which are passing into the catalytic converter, i.e. the so-called "secondary" air/fuel ratio, within a rather narrow range near to stoichiometric, in order effectively to utilize the 3-way catalytic converter to purify the exhaust gases to an acceptable level of all of the abovementioned undesirable components.

In order to perform this control of secondary air/fuel ratio, in an internal combustion engine which is equipped with a 3-way catalytic converter, the primary air/fuel ratio, i.e. the air/fuel ratio of the air-fuel mixture which is supplied by the carburetor to the engine, is conventionally set to be slightly lower than stoichiometric, i.e. to be on the rich side of stoichiometric, and then a certain amount of secondary air is supplied into the exhaust manifold of the internal combustion engine, before the 3-way catalytic converter. The oxygen in the exhaust gases is continuously detected with an oxygen detector, such as an $O_2$ sensor, or the like. The abovementioned supply of secondary air to the exhaust manifold is controlled, according to the signal from the oxygen detector, in such a way that the secondary air/fuel ratio of the exhaust gases, before they are introduced into the 3-way catalytic converter, is controlled within said certain narrow range around stoichiometric. Thereby, the operation of the 3-way catalytic converter is effectively assured, both with regard to reduction of the amount of unburnt hydrocarbons in the exhaust gases, and also with regard to reduction of the amount of nitrogen oxides.

However, a disadvantage exists with this prior art method as described above, in that it is necessary for the primary air/fuel ratio of the air-fuel mixture supplied by the carburetor to the internal combustion engine to be substantially smaller, i.e. for the air-fuel mixture to be substantially richer, than stoichiometric, in order to ensure that this level can be raised to stoichiometric by addition of secondary air after combustion of the air-fuel mixture in the combustion chambers of the engine, and, accordingly, the fuel economy of such an engine is not extremely good. Further, the amount of uncombusted hydrocarbons in the exhaust gases within the exhaust manifold, before the catalytic converter, will be rather increased, and, although by the addition of secondary air the overall air/fuel ratio of these exhaust gases is brought close to stoichiometric, nevertheless the absolute amount of uncombusted hydrocaarbons in the exhaust gases, along with the amount therein of oxygen corresponding thereto, is rather high, and the processing of these by the catalytic converter, although it can be performed satisfactorily, may well cause the converter to become rather overheated.

In consideration of the above described problems, it has been previously thought of, and proposed, to provide an air/fuel ratio control device which keeps the primary air/fuel ratio within a certain narrow range near stoichiometric, in order to allow for effective utilization of a 3-way catalytic converter, by controlling an amount of air bled into a fuel supply which is passing through a fuel passage of the carburetor to be supplied to the air intake passage of the engine, according to the signal from such an oxygen detector which is detecting the amount of oxygen in the exhaust gases emitted from the engine. The intended object of such an air/fuel ratio control device as described above, which controls the primary air/fuel ratio of the internal combustion engine, is satisfactorily attained, but a disadvantage arises in that the internal combustion engine is always operated at an air/fuel ratio which is very close to stoichiometric, and, accordingly, in an operating condition for which a rich mixture is required for the internal combustion engine, with a smaller air/fuel ratio than stoichiometric, such as a high load operating condition, or a cold engine operating condition, the performance of the engine is significantly worsened, due to the aforesaid maintenance of the primary air/fuel ratio within a narrow range around stoichiometric. This severely reduces the drivability of a vehicle incorporating such an engine.

In such a case, the drivability of the vehicle, and the usability of the engine, will not be damaged, if the primary air/fuel ratio is corrected to be richer than stoichiometric, when the particular operating conditions of the internal combustion engine demand this; but, if this is done, then accordingly the secondary air/fuel ratio will be smaller, i.e. the exhaust gases will be richer, than stoichiometric, and accordingly the 3-way catalytic converter will not effectively perform its 3-way function; in fact, the catalytic converter will effectively reduce the amount of nitrogen oxides present in the exhaust gases, but will not effectively reduce the amount of unburnt hydrocarbons present therein.

SUMMARY OF THE INVENTION

Therefore, in order to enable the proper operation of a 3-way catalytic converter, and in order for this catalytic converter to be able effectively to perform its functions of reducing both the level of uncombusted hydrocarbons and also the level of nitrogen oxides, without reducing the operability or drivability of the engine in any part of its entire operating range, using such a primary air/fuel ratio control device as described above, it becomes necessary also to provide an additional secondary air supply system, which injects secondary air into the exhaust system of the engine, in addition to the primary air/fuel ratio control device which provides bleed air for the carburetor. Such a secondary air/fuel control system must be one which controls the secondary air flow according to the signal provided by the aforesaid oxygen sensor in the exhaust system, in a feedback manner, and, accordingly, since a computing device required for determining the correct amount of secondary air to be provided must be provided independently, in addition to the computing device which determines the amount of primary air to be bled into the carburetor fuel supply for controlling the primary air/fuel ratio, the system becomes rather complicated, and its reliability and maintainability are undesirably deteriorated, thus causing a problem.

Therefore, according to this, one of the objects of the present invention is to provide an air/fuel ratio control system for an internal combustion engine, which is simple in structure, and which assures good operability and drivability of the engine over substantially its entire operational range, without reducing the performance of a 3-way catalytic converter provided to the internal combustion engine.

A further object of the present invention is provide such an air/fuel ratio control system which avoids undue overheating of the 3-way catalytic converter, as well as improving fuel economy of the vehicle to which the system is fitted.

A further object of the present invention is to provide such an air/fuel ratio control system which is cheaper to manufacture and more reliable than prior art control systems.

A further object of the present invention is to provide an air/fuel ratio control system for an internal combustion engine, in which both primary bleed air is provided to a carburetor of the engine, and also secondary air is provided to an exhaust manifold of the engine, wherein the same computing means is used for controlling the amount of primary bleed air, and also the amount of secondary air, thus providing economy of manufacture.

A yet further object of the present invention is to provide an air/fuel ratio control system as outlined above, in which the output signal of the computing means is a duty ratio coded pulse signal, and in which a simple air bleed signal cutoff device, and a simple secondary air signal cutoff device, are provided for cutting off the supply of said duty ratio coded pulse signal to an air bleed supply means and to a secondary air supply means, respectively, and air bleed signal cutoff device and said secondary air signal cutoff device both being simple and cheap to manufacture, and composed of simple logical circuits.

According to the present invention, these, and other objects are attained by, for an internal combustion engine for a vehicle, comprising an exhaust manifold, an intake manifold, and a carburetor comprising a fuel jet; an air/fuel ratio control system, comprising; an oxygen sensor, mounted within said exhaust manifold, which detects the oxygen present within said exhaust manifold and produces a sensor output signal; a means for computing a corrective signal, which receives said sensor output signal; a means for supplying secondary air to said exhaust manifold in an amount corresponding to an input signal; and a means for supplying bleed air to said jet of said carburetor in an amount corresponding to an input signal; wherein said corrective signal is fed as an input signal to said secondary air supply means and said air bleeding means; whereby the same means is used for computing a bleed air control signal and a secondary air supply signal, said corrective signal serving for both these signals.

According to such a construction, it is possible for the secondary air/fuel ratio to be kept within a narrow air/fuel ratio range around the stoichiometric level, as is necessary for effective utilization of the 3-way catalytic converter, by initially bringing the primary air/fuel ratio close to stoichiometric by application of air bleeding control, so as to ensure good operability of the internal combustion engine, and, further, by supplying secondary air into the exhaust gases after they have been combusted, thus further to adjust the air/fuel ratio of the exhaust gases which enter into the catalytic converter. And, further, this control is performed without using two separate computing devices for the control of the primary air/fuel ratio and the control of the secondary air/fuel ratio; in fact, only one such computing device is required to produce the corrective air signal.

Further, according to a particular aspect of the present invention, there are provided a secondary air signal cut off device, which selectively intercepts supply of said corrective signal to said secondary air supply means, and an air bleed signal cutoff device, which selectively intercepts the supply of said corrective signal to said air bleed supply means.

Thus, according to the particular above described aspect of the present invention, according to the provision of the air bleed cut off device and the secondary air cut off device, it is possible for the air bleed supply means and the secondary air supply means to be so controlled as to provide appropriate amounts of bleed air and secondary air, over substantially the entire operational range of the internal combustion engine.

According to a yet more particular aspect of the present invention, wherein the engine further comprises a catalytic converter, the air bleed signal cutoff device may intercept the supply of said corrective signal to said air bleed supply means and produce a signal which causes said air bleed supply means to provide no bleed air, when and only when either the vehicle road speed is below a certain predetermined value or the temperature of said engine is below a certain predetermined value, or both; and said secondary air signal cutoff device may: intercept the supply of said corrective signal to said secondary air supply means and provide thereto a signal which causes secondary air to be supplied in the maximum amount, when said engine is at a higher temperature than said certain predetermined temperature and also the rotational speed of said engine is higher than a first predetermined value and the vacuum in said intake manifold is greater than a certain predetermined value, or when the rotational speed of said engine is lower than a second specified predetermined value which is lower than said first predetermined value and also the vacuum within said intake manifold is higher than said certain predetermined value and also the temperature of said catalytic converter is lower than said certain predetermined value; or when the temperature of said engine is lower than said certain predetermined value and also the temperature of said catalytic converter is lower than said certain value and also the engine is operating in conditions other than that the rotational speed of said engine is higher than said first predetermined value and the vacuum in said intake manifold is greater than said certain predetermined value, i.e. the engine is being decelerated; and intercept the supply of said corrective signal to said secondary air supply means and supply thereto a signal which causes no secondary air to be provided, when the temperature of said catalytic converter is higher than a certain predetermined value, except when said engine is at a higher temperature than said certain predetermined temperature and also the rotational speed of said engine is higher than said first predetermined value and the vacuum in said intake manifold is greater than a certain predetermined value. Further, if, as is practiced according to a yet more particular aspect of the present invention, said corrective signal is a duty ratio coded ON/OFF pulse signal, then the air bleed signal cutoff device and the secondary air signal cutoff device may be embodied as simple combinations of simple logical switching circuits, which are easily available in quantity of a low price, and are reliable. Accordingly, the air/fuel ratio control device according to the present invention may be embodied in a robust and reliable form, which yet functions appropriately as a device for controlling the quality of the exhaust gases produced by the engine, both with regard to purifying them of unburnt hydrocarbons, and also of nitrogen oxides.

BRIEF DESCRIPTION OF THE DRAWINGS

The present invention will now be shown and described with reference to several preferred embodiments thereof, and with reference to the illustrative drawings. It should be clearly understood, however, that the description of the embodiments, and the drawings, are all of them given purely for the purposes of explanation and exemplification only, and are none of them intended to be limitative of the scope of the present invention in any way, since the scope of the present invention is to be defined solely by the legitimate and proper scope of the appended claims. In the drawings:

DESCRIPTION OF THE PREFERRED EMBODIMENTS

Figure 1:
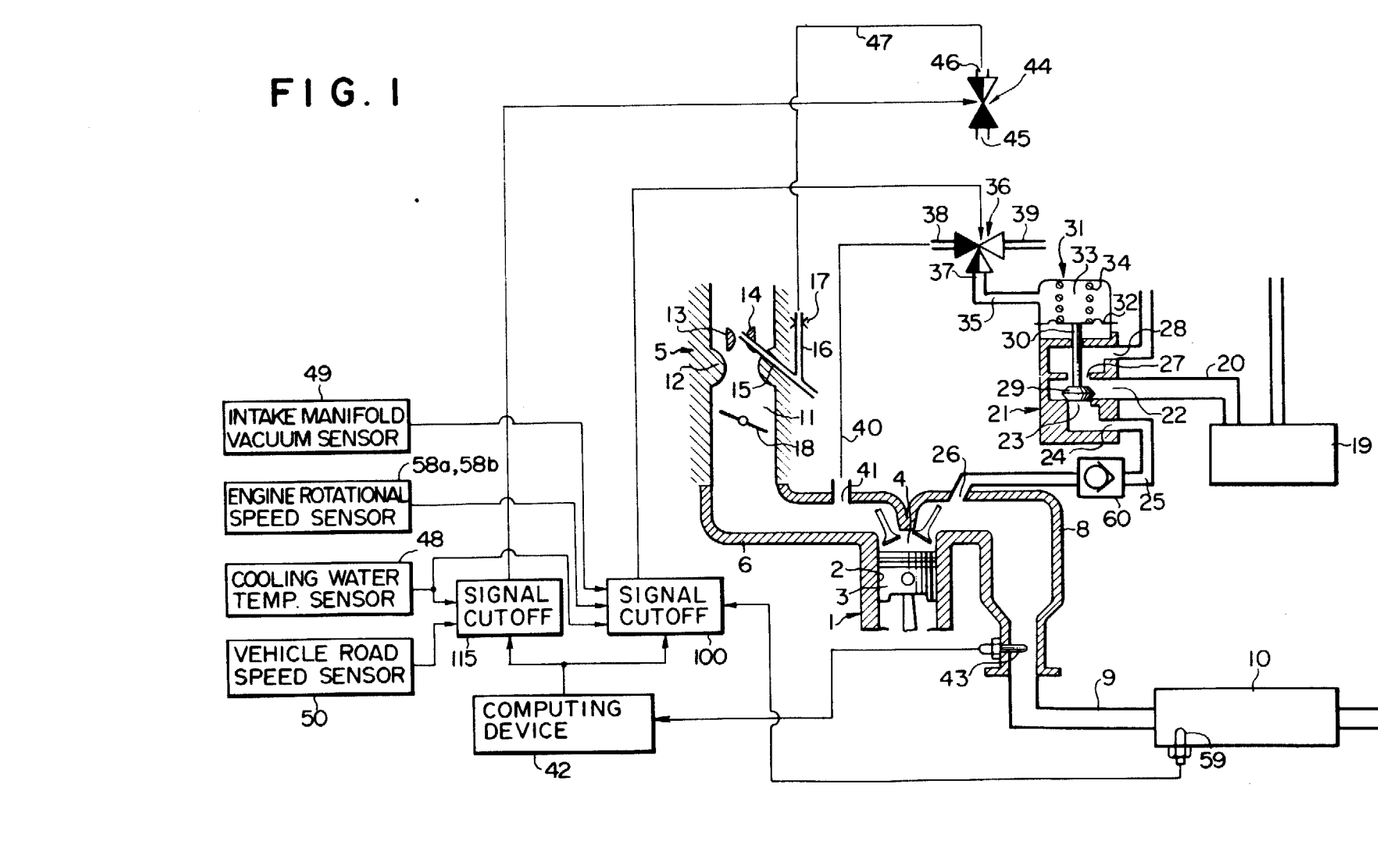
FIG. 1 is a schematic constructional diagram, partly sectional, illustrating in partly block diagram form the construction of an air/fuel ratio control device which is a first embodiment of the present invention, and also showing in schematic sectional form part of an internal combustion engine to which said air/fuel ratio control device is fitted.

The present invention will now be described in terms of several preferred embodiments thereof, and with reference to the illustrative drawings. FIG. 1 is a simplified structural diagram, showing a first embodiment of the air/fuel ratio control device for an internal combustion engine according to the present invention. In this drawing, an internal combustion engine 1 is formed with a cylinder bore 2 within which reciprocates an engine piston 3, a combustion chamber 4 being defined in the space above the engine piston 3 in the drawing. The reciprocating movement of the piston 3 sucks in fuel-air mixture through a carburetor 5 and through an intake manifold 6 into the combustion chamber 4, wherein this mixture is combusted, and exhausts exhaust gases into an exhaust manifold 8, wherefrom they pass into an exhaust pipe 9 and then into a three way catalytic converter 10, from which they are exhausted to the atmosphere.

In the air intake passage 11 of the carburetor 5 there is provided a large venturi 12, within which there is provided a small venturi 13. Downstream of the large venturi 12 in the air intake passage 11 there is provided a throttle butterfly valve 18 so as to control the flow of intake air through the air intake passage 11. In the throat of the small venturi 13 there opens a fuel nozzle 14, to which there is supplied liquid fuel such as gasoline from a carburetor float chamber (not shown in the drawings) through a fuel supply passage 15. The flow rate of this supply of liquid fuel is suitably adjusted so as to provide a basically suitable air-fuel mixture for the internal combustion engine 1. To an intermediate point of the fuel supply passage 15 there is connected one end of an air bleed passage 16, which serves for introducing a certain amount of bleed air into the fuel supply passage 15. The basic amount of air flowing through this air bleed passage 16 is regulated by an air bleed throttling jet 17.

Although not shown in the drawing, the carburetor 5 may be provided with a main air bleed passage, for supplying a main or basic amount of bleed air, and the air bleed passage 16 may be provided as an extra air bleed passage.

A secondary air pump 19 is provided, and is driven by the internal combustion engine 1 or by some similar means. The secondary air pump 19 compresses air from the atmosphere and ejects it into the air conduit 20, from which it is sent to a secondary air control valve 21. The valve 21 has two air output ports, an output port 24 and an air relief port 28. Further, within the valve 21 there are two control ports, a supply port 23 and a vent port 27. A valve element 29 is mounted on a valve rod 30 so as to be slidable within the body of the secondary air control valve 21, upwards and downwards in the drawing, and this valve element 29 cooperates with the supply port 23 and the vent port 27 so that, as it approaches either one of these ports, it recedes from the other. Thereby, the proportion in which the air supplied to the intake port 22 is divided between the vent port 27 and the supply port 23 varies according to the position assumed by the valve element 29 and the valve rod 30.

The supply port 23 is connected to the output port 24, and the vent port 27 is connected to the air relief port 28. Air which is output from the secondary air control valve 21 via its air relief port 28 is vented to the atmosphere, while on the other hand air which is output from the secondary air control valve 21 via its output port 24 is sent, via an air conduit 25 and a one way air valve 60, to a secondary air injection port 26 provided in the exhaust manifold 8. The one way air valve 60 is provided in order to prevent reverse flow through the air conduit 25, i.e. flow of exhaust gas back up from the exhaust manifold 8 to the control valve 21.

The motion of the valve rod 30 and the valve element 29 is controlled by a diaphragm actuating device 31. The upper end in the drawing of the valve rod 30 is connected to the diaphragm 32 of this actuating device 31, and this diaphragm 32 is biased downwards in the drawings by a compression coil spring 34 which is mounted within a diaphragm chamber 33 of the actuating device 31, defined above the diaphragm 32. Negative pressure is selectively introduced into third diaphragm chamber 33 of the activating device 31 via the vacuum conduit 35.

Thus, the valve rod 30 and the valve element 29 are driven upwards in the drawing when negative pressure is supplied via the vacuum conduit 35 to the diaphragm chamber 33 of the diaphragm actuating device 31, against the biasing action of the compression coil spring 34; and on the other hand, when negative pressure is not supplied to the diaphragm chamber 33 of the actuating device 31, the valve rod 30 and the valve element 29 are biased downwards in the drawing by the action of the compression coil spring 34. When the valve element 29 and the valve rod 30 are in their downward positions, as shown in the drawing, it completely closes the supply port 23 and opens the vent port 27 to its maximum extent, and in this condition all of the air which is supplied to the intake port 22 of the secondary air control valve 21 is vented to the atmosphere via the air relief port 28. On the other hand, when the valve element 29 and the valve rod 30 are in their upward positions, the valve element 29 completely closes the vent port 27 and opens the supply port 23 to its maximum extent, and in this condition all of the air which is supplied to the intake port 22 of the secondary air control valve 21 is output from the output port 24 thereof, and via the vacuum conduit 25 and the one way air valve 60 is supplied to the exhaust manifold 8 through the secondary air injection port 26.

To the end of the vacuum conduit 35 remote from the diaphragm actuating device 31 there is connected a control port 37 of an electromagnetic vacuum switching valve 36. The switching valve 36 has a vacuum port 38 and an atmospheric pressure port 39. The atmospheric pressure port 39 is opened to the atmosphere, and the vacuum port 38 is supplied with vacuum, via a vacuum conduit 40, from a vacuum takeoff port 41 which is provided as opening into the intake manifold 6. When an electromagnetic solenoid, not shown, of the electromagnetic vacuum switching valve 36 is supplied with energizing electrical power, then the control port 37 and the vacuum port 38 thereof are connected together, and accordingly the diaphragm chamber 33 is supplied with vacuum from the vacuum takeoff port 41. On the other hand, when the electromagnetic solenoid of the vacuum switching valve 36 is not supplied with energizing electrical power, then the vacuum switching valve 36 connects the atmospheric pressure port 39 to the vacuum conduit 35, and, accordingly, atmospheric pressure is introduced into the diapragm chamber 33.

An electrical computing device 42 determines the correct amount of air necessary for correcting the air/fuel ratio for the engine, on the basis of a signal generated by an oxygen sensor 43 which is mounted in the exhaust manifold 8 downstream of the secondary air inlet port 26. The electrical computing device 42, in this embodiment, outputs a pulse signal whose duty ratio corresponds to the corrective air amount required, and this signal is sent to a secondary air signal cutoff device 100 and an air bleed signal cutoff device 115. The process of generation of this signal within the electrical computing device 42 will not be further explained here, because it is per se conventional and well known in the art.

The secondary air signal cutoff device 100 and the air bleed signal cutoff device 115 control, respectively, supply of the above mentioned pulse signal from the electrical computing device 42 to the electromagnetic vacuum switching valve 36, and to an electromagnetic air bleed control valve 44. The electromagnetic air bleed control valve 44 has two ports, an atmospheric pressure port 45 and a bleed air port 46. The atmospheric pressure port 45 is open to the atmosphere, while the bleed air port 46 is connected, via a bleed air conduit 47, to the end of the air bleed passage 16 in the carburetor 5 remote from the fuel supply passage 15. The air bleed control valve 44 is so constructed that, when an electromagnetic solenoid (not shown) therein is supplied with actuating electrical energy, it communicates the atmospheric pressure port 45 to the bleed air port 46; while, on the other hand, when said electromagnetic solenoid is not supplied with actuating electrical energy, then it shuts off the atmospheric pressure port 45 from the bleed air port 46.

The particular advantage of the air/fuel ratio control device according to the present invention is that only one computing means such as the electrical computing device 42 need be provided therein, although both control of bleeding of air into the carburetor, and also control of supply of secondary air to the exhaust manifold, are performed. This represents a very notable improvement in simplicity over prior art devices, and reduces manufacturing cost and also increases reliability.

As mentioned above, the supply of the pulse signal having duty ratio corresponding to the amount of excess air required, produced by the electrical computing device 42, and supplied both to the electromagnetic vacuum switching valve 36 and to the electromagnetic air bleed control valve 44, is controlled by the secondary air signal cutoff device 100 and the air bleed signal cutoff device 115, respectively. The construction of an embodiment of this secondary air signal cutoff device 100, and of an embodiment of this air bleed signal cutoff device 115, will now be explained. Because the signal output by the electrical computing device 42 is an ON/OFF pulse signal, the information in which is conveyed by its duty ratio, the secondary air signal cutoff device 100 and the air bleed signal cutoff device 115 may be simply embodied as combinations of simple logical switching circuits.

Figure 2:
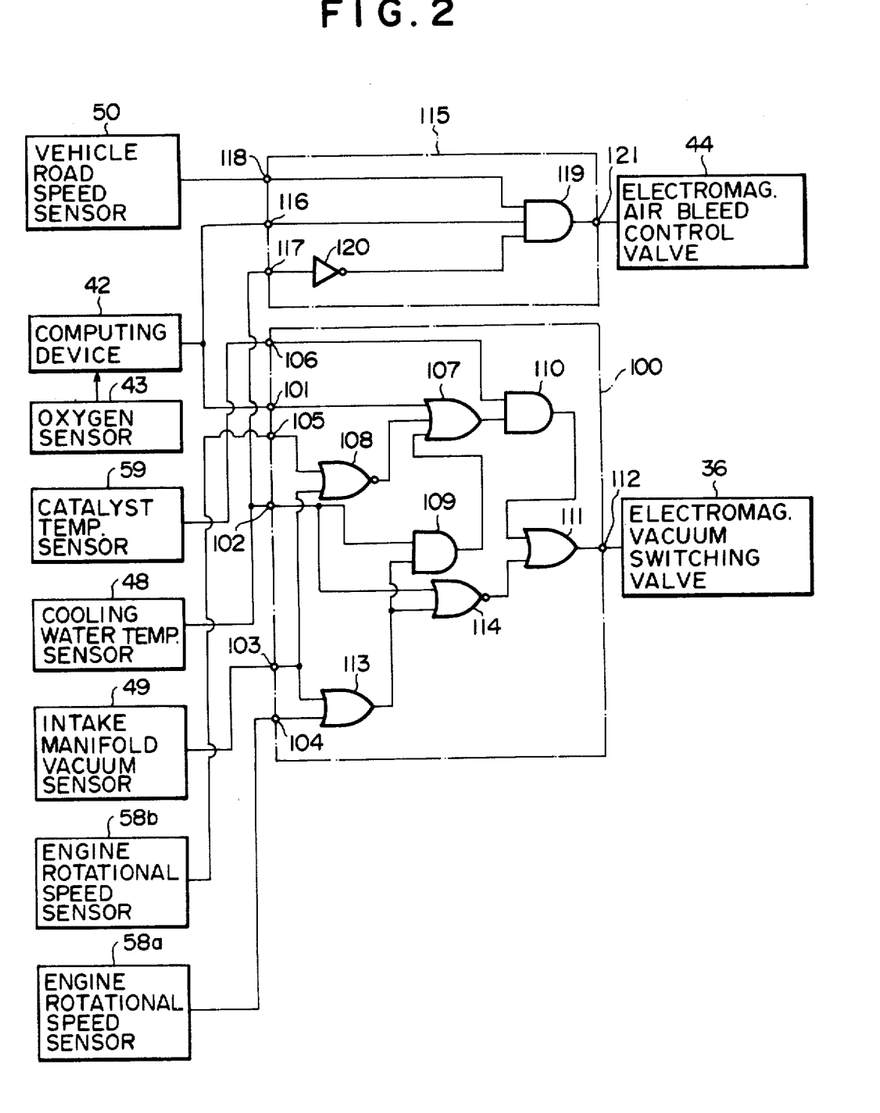
FIG. 2 is a block diagram, showing particularly the logical structure of a secondary air signal cut off device and an air bleed signal cut off device, incorporated in the first embodiment shown in FIG. 1.

FIG. 2 is a block diagram, showing the construction of the circuits of the preferred embodiments of the secondary air signal cutoff device 100 and the air bleed signal cutoff device 115. The secondary air signal cutoff device 100 and the air bleed signal cutoff device 115 receive the aforesaid duty ratio coded pulse signal from the electrical computing device 42, respectively, at the first input terminal 101 and the first input terminal 116. Further, to the second input terminal 102 of the secondary air signal cutoff device 100, and to the second input terminal 117 of the air bleed signal cutoff device 115, there is supplied a signal from an engine cooling water temperature sensor 48 which is representative of the temperature of the internal combustion engine 1. This cooling water temperature sensor 48 is so constructed that it generates a "1" signal when the temperature of the cooling water of the internal combustion engine 1 is below a certain specified value, for example 50° C., and generates a "0" signal otherwise.

Further, to the secondary air signal cutoff device 100 there are supplied: to the third input terminal 103, a signal from a intake manifold vacuum sensor 49; to the forth input terminal 104, a signal from a first engine rotational speed sensor 58a; to the fifth input terminal 105, a signal from a second engine rotational speed sensor 58b; and, to the sixth input terminal 106, a signal from a catalyst temperature sensor 59. On the other hand, the air bleed signal cutoff device 115 is supplied, at its third input terminal 118, with a signal from a vehicle road speed sensor 50.

The intake manifold vacuum sensor 49 is a vacuum or negative pressure sensor mounted in the intake manifold 6, and is so constructed as to generate a "1" signal when the vacuum within the intake manifold 6 is less than a specified value, for example 400 mmHg, and to generate a "0" signal otherwise. The first engine rotational speed sensor 58a is so constructed as to generate a "1" signal when the rotational speed of the internal combustion engine 1 is below a certain specified value, such as, for example, 2100 rpm, and to generate a "0" signal otherwise. The second engine rotational speed sensor 58b is so constructed as to generate a "1" signal when the rotational speed of the internal combustion engine 1 is higher than a certain specified value, for example, 1000 rpm, and to generate a "0" signal otherwise. The catalyst temperature sensor 59 is fitted to the three way catalytic converter 10, and senses the temperature of the catalyst therein. This sensor 59 is so constructed as to generate a "0" signal when the temperature of the catalyst within the three way catalytic converter 10 exceeds, for example, the value of 750° C., and otherwise to generate a "1" signal.

In the secondary air signal cutoff device 100, the signal from the second engine rotational speed sensor 58b, via the fifth input terminal 105, and the signal from the intake manifold vacuum sensor 49, via the third input terminal 103, are sent to a NOR circuit 108. Further, the signal from the first engine rotational speed sensor 58a, via the fourth input terminal 104, and the aforesaid signal from the intake manifold vacuum sensor 49, via the third input terminal 103, are sent to an OR circuit 113. The output of the OR circuit 113, and also the signal from the engine cooling water temperature sensor 48, via the second input terminal 102, are sent to an AND circuit 109, and are also sent to a NOR circuit 114. The signal from the electrical computing device 42, via the first input terminal 101, the output signal of the NOR circuit 108, and the output signal of the AND circuit 109, are all fed to a three way OR circuit 107. The output of the three way OR circuit 107, and the signal from the catalyst temperature sensor 59, via the sixth input terminal 106, are fed to an AND circuit 110, and the output of this AND circuit 110 and the output of the NOR circuit 114 are fed to an OR circuit 111, the output of which is fed to the output terminal 112 of the secondary air signal cutoff device 100, whence it is supplied to the electromagnetic vacuum switching valve 36.

Further, in the air bleed signal cutoff device 115, the output signal of the electrical computing device 42, via the first input terminal 116, the output signal of the vehicle road speed sensor 50, via the third input terminal 118, and the output signal of the engine cooling water temperature sensor 48, via the second input terminal 117 and a NOT circuit 120, are fed to a three way AND circuit 119, the output of which is fed to the output terminal 121 of the air bleed signal cutoff device 115 and thence to the electromagnetic air bleed control valve 44.

The operation of the secondary air signal cutoff device 100 is as follows. The NOR circuit 108 produces a "1" signal only when both of its inputs are "0" signals, i.e., when the output of the second engine rotational speed sensor 58b is a "0" signal and also the output of the intake manifold vacuum sensor 49 is a "0" signal; in other words, when the rotational speed of the engine is less than 1000 rpm and also the vacuum present in the intake manifold 6 is greater than 400 mmHg, i.e., when the internal combustion engine 1 is in the idling operational condition. The output of the AND circuit 109 is a "1" signal only when both of its inputs are "1" signals, i.e., only when the output of the engine cooling water temperature sensor 48 is a "1" signal and also (by the operation of the OR circuit 113) either the output of the intake manifold vacuum sensor 49 or the output of the first engine rotational speed sensor 58a is a "1" signal; i.e., only when the temperature of the cooling water of the internal combustion engine 1 is below 50° C. and also either the vacuum in the intake manifold 6 is less than 400 mmHg, or alternatively the engine rotational speed is less than 2100 rpm. The NOR circuit 114 receives the signal from the engine cooling water temperature sensor 48 via the second input terminal 102, and also receives the output of the OR circuit 113. Thus, the output of the NOR circuit 114 is a "1" signal only when both the signals supplied thereto are "0" signals, i.e., when both the temperature of the cooling water of the internal combustion engine 1 is greater than 50° C. and also the rotational speed of the internal combustion engine 1 is greater than 2100 rpm and the vacuum in the intake manifold 6 is greater than 400 mmHg. According to this preferred embodiment of the present invention, it is considered that, when the rotational speed of the internal combustion engine 1 is greater than 2100 rpm. and also the vacuum in the intake manifold 6 is greater than 400 mmHg, the automotive vehicle is being operated in the decelerating operational condition. That is to say, a "0" signal output for the OR circuit 113 is taken as indicating the decelerating operating condition. Thus, the output of the NOR circuit 114 is a "1" signal only when the vehicle is decelerating in the warm engine condition.

Thus, the operating solenoid of the electromagnetic vacuum switching valve 36 is positively energized all the time, so as to supply a continuous supply of secondary air in the maximum amount from the secondary air pump 19, via the secondary air control valve 21 and the air conduit 25, to the secondary air injection port 26 in the exhaust manifold 8, when the lower terminal in the figure of the OR circuit 111 is supplied with a "1" signal, i.e., when the internal combustion engine 1 is in the decelerating condition and is warm. However, if the internal combustion engine 1 is not in such a engine warm decelerating condition, then the output of the NOR circuit 114 will be a "0" signal, and, accordingly, the electromagnetic vacuum switching valve 36 will receive, via the output terminal 112, a signal which is the same as the output signal of the AND circuit 110.

If the temperature of the catalyst in the three way catalytic converter 10 is excessively high, i.e., in this preferred embodiment, if it is greater than 750° C., then the catalyst temperature sensor 59 will output a "0" signal to the upper input terminal in the figure of the AND circuit 110, via the input terminal 106, and accordingly the output of the AND circuit 110 will be a "0" signal, and no secondary air will be provided by the operation of the electromagnetic vacuum switching valve 36, unless as explained above the engine is being decelerated in the warm condition. On the other hand, if the temperature of the catalyst in the three way catalytic converter 10 is not excessive, then the output signal from the catalyst temperature sensor 59 will be a "1" signal, and accordingly the output signal of the AND circuit 110 will be a signal which is the same as the output signal of the three way OR circuit 107, and, if the engine is not being decelerated in the warm condition, therefore, the signal provided to the electromagnetic vacuum switching valve 36 will be the same as the output signal of the three way OR circuit 107.

The output signal of the three way OR circuit 107 is a "1" signal if any of its three input signals is a "1" signal. That is to say, as explained above, if the engine is in the idling operational condition, the "1" output signal from the NOR circuit 108 induces an uninterrupted "1" signal as the output of the three way OR circuit 107 if the engine is cold and not in the decelerating condition, then the output signal of the AND circuit 109 induces an uninterrupted "1" signal as the output of the three way OR circuit 107; but, if neither of these conditions is the case, then the pulse signal from the electrical computing device 42, which has a duty ratio corresponding to the amount of secondary air required to be supplied to the exhaust manifold 8 from the secondary air pump 19 via the secondary air control valve 21 and to the amount of bleed air required to be supplied to the fuel supply passage 15, is transmitted, via the first input terminal 101, the OR circuit 107, the AND circuit 110, and the OR circuit 111, to the output terminal 112 of the secondary air signal cutoff device 100, and thence is supplied to the electromagnetic vacuum switching valve 36.

On the other hand, if the internal combustion engine 1 is in the idling condition, or is in the cold non-decelerating condition, then a constant "1" signal is supplied by the three way OR circuit 107 to the AND circuit 110, and, providing that the catalyst in the three way catalytic converter 10 is not very hot, this "1" signal is positively sent to the electromagnetic vacuum switching valve 36, and, accordingly, the maximum amount of secondary air is recirculated to the exhaust manifold 8.

In other words, when the temperature of the catalyst in the three way catalytic converter 10 is not extremely high, and the engine cooling water of the internal combustion engine 1 is warm, the signal from the electrical computing device 42 is supplied to the electromagnetic vacuum switching valve 36, except when the engine is idling, or is decelerating. Further, when the catalyst temperature is not extremely high, and the engine cooling water temperature is low, and also the engine is in the decelerating condition, then, again, the signal from the electrical computing device 42 is provided to the electromagnetic vacuum switching valve 36.

Of course, when the signal from the electrical computing device 42, i.e. the aforesaid duty ratio coded pulse signal, is being provided to the electromagnetic vacuum switching valve 36, then the flow rate of secondary air provided by the secondary air pump 19 via the secondary air control valve 21 and the air conduit 25 to the secondary air injection port 26 in the exhaust manifold 8 is feedback controlled according to the signal generated from the oxygen sensor 43, which is mounted in the exhaust manifold 8 downstream of the secondary air injection port 26.

However, in the following three cases: (a) when the engine cooling water temperature is high and also the engine is being decelerated; (b) the catalyst temperature is not extremely high and the engine is idling; or (c) the catalyst temperature is not extremely high and the engine cooling water temperature is low and the engine is not decelerated; then the output terminal 112 is continuously receiving a "1" signal. At such a time, the control port 37 and the vacuum port 38 of the electromagnetic vacuum switching valve 36 are continuously connected, and, accordingly, the secondary air control valve 21 is wide open, and secondary air is supplied in the maximum amount.

If the temperature of the catalyst within the three way catalytic converter 10 is extremely high, then, except when the engine is warm and is being decelerated, the electromagnetic vacuum switching valve 36 continuously receives a "0" signal. At this time, the control port 37 and the atmospheric pressure port 39 of the electromagnetic vacuum switching valve 36 are continuously connected, and accordingly the secondary air control valve 21 is continuously in its condition wherein it provides no communication between its input port 22 and its output port 24, and accordingly no supply of secondary air is provided to the exhaust manifold 8.

The air bleed signal cutoff device 115 receives the duty ratio coded pulse signal from the electrical computing device 42 at its first input terminal 116, and receives the cooling water temperature signal from the engine cooling water temperature sensor 48 at its second input terminal 117. Further, the air bleed signal cutoff device 115 receives at its third input terminal 118 a signal from a vehicle road speed sensor 50. The vehicle road speed sensor 50 is so constructed that it provides a "1" signal when, and only when, the road speed of the vehicle is higher than a certain specified value, 65 kph or 40 mph for example, and provides a "0" signal if the vehicle is moving slower than this specified speed.

The output of the air bleed signal cutoff device 115 is sent to the electromagnetic air bleed control valve 44 from its output terminal 121. The output terminal 121 receives the output of a three way AND circuit 119, which is supplied with the output signal from the vehicle road speed sensor 50, the duty ratio coded pulse signal from the electrical computing device 42, and also with the water temperature signal from the engine cooling water temperature sensor 48 via a NOT circuit 120. Thereby, as will be clear, the electromagnetic air bleed control valve 44 is supplied with the duty ratio coded pulse signal from the electrical computing device 42 when the vehicle is moving at a speed higher than the specified speed and also the internal combustion engine 1 is warm, and is otherwise supplied with a "0" signal and accordingly provides no supply of bleed air to the air bleed passage 16 in the carburetor 5.

Therefore, either when the speed of the vehicle is below, in this example, 65 kph, or when the engine cooling water temperature is below, in this example, 50° C., or both, the electromagnetic air bleed control valve 44 is definitely not energized, and, accordingly, air bleeding via the air bleed passage 16 is positively prevented.

The operation of this first embodiment is as follows. The electrical computing device 42 generates a pulse signal having a duty ratio corresponding to the amount of secondary air and air bleeding required, according to the signal from the oxygen sensor 43 mounted in the exhaust manifold 8, and this signal is fed to the electromagnetic vacuum switching valve 36 and the electromagnetic air bleed control valve 44, in the respectively above specified operational conditions, under the control of lthe secondary air signal cutoff device 100 and the air bleed signal cutoff device 115. The duty ratio of the pulse signal from the electrical computing device 42 becomes greater as the excess oxygen amount in the exhaust gas flowing through the exhaust manifold 8 decreases, i.e. as the secondary air/fuel ratio becomes smaller than stoichiometric. Therefore, according to the duty ratio of the pulse signal generated by the electrical computing device 42, the electromagnetic vacuum switching valve 36 successively communicates the control port 37 either to the vacuum port 38 or to the atmospheric pressure port 39, and thereby alternately supplies atmospheric pressure and inlet manifold vacuum to the diaphragm chamber 33 of the diaphragm actuating device 31. Accordingly, the valve element 29 and the valve rod 30 of the secondary air control valve 21 are successively moved by the diaphragm 32 of the diaphragm actuating device 31 between their upper and their lower positions in FIG. 1, at the same frequency and duty ratio as those of the aforesaid pulse signal, and accordingly the desired amount of secondary air required for correcting the secondary air/fuel ratio to a narrow range about stoichiometric is supplied into the exhaust manifold 8 from the secondary air pump 19, via the air conduit 20, the intake port 22, the supply port 23, the output port 24, the air conduit 25, the one way air valve 60, and the secondary air injection port 26.

Further, according to the same frequency and duty ratio of the same above mentioned pulse signal, the electromagnetic air bleed control valve 44 alternately communicates the atmosphere port 45 with the bleed air port 46, and cuts off this communication. Thereby, the air bleed passage 16 of the carburetor 5 is alternately opened and closed with a duty ratio corresponding to the duty ratio of the pulse signal from the electrical computing device 42. Thereby, as the air bleed passage 16 is successively opened and closed as described above, the amount of fuel which flows out from the fuel nozzle 14 into the air intake passage 11 is reduced, by the injection of bleed air thereinto, and, accordingly, the primary air/fuel ratio is increased. It is so arranged, in harmony with this arrangement, that the basic air/fuel ratio of the carburetor 5, and the flow rate characteristics of the air bleed jet 17, are such that the primary air/fuel ratio does not increase beyond the stoichiometric air/fuel ratio, even when the air bleed passage 16 is fully opened by the action of the electromagnetic air bleed control valve 44, and the amount of fuel flowing out of the fuel nozzle 14 is reduced to the maximum amount by the injection of this secondary bleed air.

Thereby it is seen, as explained above, that, when the secondary air/fuel ratio is smaller than stoichiometric, secondary air is supplied to the exhaust system of the internal combustion engine 1, and the secondary air/fuel ratio is corrected in this exhaust system. Further, the primary air/fuel ratio is brought nearer to the stoichiometric, via the control of the air bleeding amount in the carburetor 5 performed by the electromagnetic air bleed control valve 44. Thereby, fuel economy of the internal combustion engine 1 may be improved, as compared to the case of control wherein the secondary air/fuel ratio of the exhaust gas entering into the three way catalytic converter 10 is maintained within a narrow range near the stoichiometric condition only by supply of secondary air to the exhaust manifold 8. Further, the overheating of the three way catalytic converter 10 is more positively guarded against, by reduction of the amount of uncombusted hydrocarbons in the exhaust gas within the exhaust manifold 8, caused by over-richness of the mixture provided by the carburetor 5.

It is seen that, according to the present invention, the control of the amount of air bleeding at the carburetor 5 is done using the same control signal as is provided for the secondary air/fuel ratio control which is done by injection of secondary air into the exhaust manifold 8. Thereby, only one computing device such as the electrical computing device 42 is required for production both of the signal required to control the primary air/fuel ratio provided by the carburetor 5, and also for production of the signal required for the control of the secondary air/fuel mixture provided by the secondary air control valve 21. This significantly reduces complexity of the device, and the cost of production thereof, over prior art systems in which two separate computing devices were required for production of these two control signals. The overriding of these control signals by the secondary air signal cutoff device 100 and the air bleed signal cutoff device 115 is thus performed by a pair of relatively simple low cost devices, which are reliable and compact, and, accordingly, are much cheaper to produce than are such devices as the electrical computing device 42.

Figure 3:
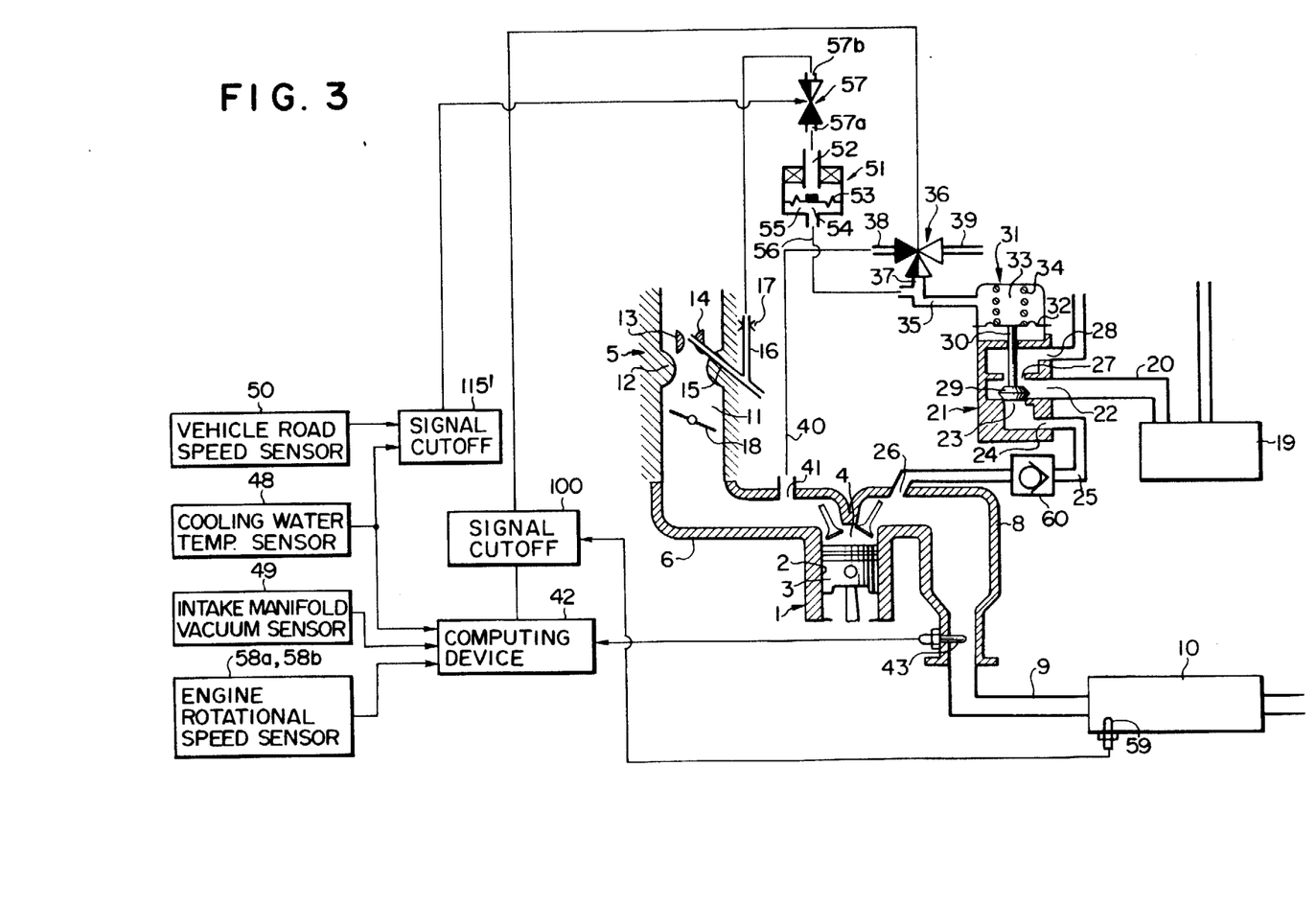
FIG. 3 is a schematic drawing, partly sectional, showing, in a fashion similar to FIG. 1, the construction of an air/fuel ratio control device which is a second embodiment of the present invention, and an internal combustion engine to which it is fitted.

FIG. 3 is a simple structural drawing, showing a second embodiment of the air/fuel ratio control device according to the present invention. In this figure, parts which correspond to parts in the first embodiment shown in FIGS. 1 and 2, and which have the same functions, are designated by the same reference numerals.

In this embodiment, the function of the secondary air supply system, comprising the secondary air pump 19, the secondary air control valve 21, the air conduit 25, and the secondary air injection port 26, and controlled by the electromagnetic vacuum switching valve 36, is essentially the same as in the first embodiment. Further, the control of the electromagnetic vacuum switching valve 36 is performed by the electrical computing device 42, via the secondary air signal cutoff device 100, in the same manner as before.

However, the air bleed passage 16, in this embodiment, is selectively opened and closed by a vacuum control valve 51. The vacuum control valve 51 comprises a port 52 which is connected to the end of the air bleed passage 16 remote from the carburetor 5, and this port 52 is selectively opened and closed by a valve element 54 which is supported on a diaphragm 53. The diaphragm 53 moves the valve element 54 away from the port 52 when a vacuum greater than a certain predetermined value is supplied to the diaphragm chamber 55 which is defined below the diaphragm 53 in the drawing, and thus relieves the port 52 to the atmosphere at an opening amount which corresponds to the magnitude of said vacuum, but, on the other hand, closes the port 52 with the valve element 54 when vacuum not exceeding the said specified value is supplied to the diaphragm chamber 55. The diaphragm chamber 55 is connected to an intermediate portion of the vacuum conduit 35 via the vacuum conduit 56, and accordingly receives a vacuum which is substantially the same as that provided to the diaphragm chamber 33 of the diaphragm actuating device 31.

Further, the air bleed passage 16 is also selectively opened and closed by an electromagnetic control valve 57, independently of the operation of the vacuum control valve 51. The electromagnetic control valve 57 communicates its ports 57a and 57b when, and only when, its solenoid (not shown in the drawing) is energized, and cuts off this communication when its solenoid is not energized.

The solenoid of the electromagnetic control valve 57 is selectively energized by the air bleed signal cutoff device 115'. The air bleed signal cutoff device 115', in contradistinction to the air bleed signal cutoff device 115 of the first embodiment, does not receive any signal from the electrical computing device 42. On the contrary, the air bleed signal cutoff device 115' in this embodiment receives a signal representing the road speed of the automobile from the vehicle road speed sensor 50, and a signal representing the engine cooling water temperature, from the engine cooling water temperature sensor 48, and energizes the solenoid of the electromagnetic control valve 57 only when the vehicle road speed is over the aforesaid specified value (65 kph, for example), and also the engine cooling water temperature is greater than the specified value (50° C., for example). Therefore, only when the vehicle speed is higher than the specified value, and the engine cooling water temperature is higher than the specified value, the port 57a is communicated to the port 57b, and the control of the opening and closing duty ratio amount of the air bleed passage 16 is performed by the vacuum control valve 51.

Thus, in this embodiment, when the diaphragm chamber 33 of the diaphragm actuating device 31 is supplied with vacuum by the electromagnetic vacuum switching valve 36, with the electromagnetic control valve 57 in the open condition, and thus, via the action of the secondary air control valve 21, secondary air is being supplied to the exhaust manifold 8, at this time the diaphragm chamber 55 of the vacuum control valve 51 is receiving the same vacuum pressure as that which is being supplied to the diaphragm chamber 33, and, accordingly, the port 52 is opened and communicated to the atmosphere according to the same duty ratio of the negative pressure supplied to the diaphragm chamber 33 of the diaphragm actuating device 31. Accordingly, the primary air/fuel ratio is corrected, by bleeding of air from the atmosphere into the air bleed passage 16, according to the same duty ratio of the vacuum supplied to the diaphragm chamber 33 of the diaphragm actuating device 31.

In this embodiment, therefore, the control of air bleed amount is performed by the same negative pressure which is supplied to the air control valve for secondary air control, and therefore, in this case also, no special control signal for the supply of bleed air to the carburetor 5 is required. In this embodiment, therefore, continuous supply and cut off of bleed air are performed corresponding to those of secondary air due to the secondary air signal cut off device 100, over which the on/off control by the air bleed signal cut off device 115' is superposed.

Thus it is seen that according to the present invention no special computing device or the like, such as the electrical computing device 42, is required for particularly controlling the amount of air bled to the carburetor 5. That is to say, the calculations performed by the electrical computing device 42 are used both for controlling the amount of secondary air provided to the exhaust manifold 8, and also for controlling the amount of air bled to the carburetor 5, in order to control the primary air/fuel ratio. Therefore, in this embodiment also, the construction of the device is simplified, as compared with the construction of prior art devices as outlined above, and also the reliability thereof is increased and the cost of manufacturing thereof is decreased.

Although the present invention has been shown and described with reference to several preferred embodiments thereof, and in terms of the illustrative drawings, it should not be considered as limited thereby. Various possible modifications, omissions, and alterations could be conceived of by one skilled in the art to the form and the content of any particular embodiment, without departing from the scope of the present invention. Therefore it is desired that the scope of the present invention, and of the protection sought to be granted by Letters Patent, should be defined not by any of the perhaps purely fortuitous details of the shown embodiments, or of the drawings, but solely by the scope of the appended claims, which follow.

We claim:

1. For an internal combustion engine for a vehicle, comprising an exhaust manifold, a catalytic converter mounted to said exhaust manifold, an intake manifold, and a carburetor comprising a fuel jet;

an air/fuel ratio control system, comprising:

an oxygen sensor, mounted within said exhaust manifold, which detects the oxygen present within said exhaust manifold and produces a sensor output signal;

a means for computing a corrective signal for controlling the amount of air for air bleeding and secondary air injection based upon said sensor output signal;

a means for supplying secondary air to said exhaust manifold in an amount corresponding to an input signal;

a means for supplying bleed air to said jet of said carburetor in an amount corresponding to an input signal;

a means for feeding said corrective signal to said secondary air supply means and said air bleeding means;

a vehicle road speed sensor which detects whether the road speed of the vehicle is at or above a predetermined first value which indicates that the vehicle is not in a heavily loaded condition;

an engine cooling water temperature sensor which detects whether the temperature of the cooling water of the engine is at or above a predetermined second value which indicates that the engine is in a warmed up condition;

an intake manifold vacuum sensor which detects whether the manifold vacuum is at or above a predetermined third value which indicates that the engine is in idling operation;

a first engine rotational speed sensor which detects whether the rotational speed of the engine is at or above a predetermined forth value which indicates that the engine is at least in stable idling operation;

a second engine rotational speed sensor which detects whether the rotational speed of the engine is at or above a predetermined fifth value which indicates that the engine is above the idling condition; and, a catalyst temperature sensor which detects whether the temperature of the catalytic converter is within a safe temperature range;

wherein said corrective signal feeding means comprises:

an air bleed signal cutoff device which intercepts the feeding of said corrective signal to said air bleeding means unless the road speed of the vehicle is at or above said predetermined first value and the temperature of the cooling water of the engine is at or above said predetermined second value; and, a secondary air signal cutoff device which intercepts the feeding of said corrective signal to said secondary air supply means when at least one of the following four conditions is encountered:

(a) the temperature of the catalytic converter is out of said safe temperature range;

(b) the temperature of the cooling water of the engine is at or above said predetermined second value, the manifold vacuum is at or above said predetermined third value, and the rotational speed of the engine is at or above said predetermined fifth value;

(c) the temperature of the catalytic converter is within said safe temperature range, and the rotational speed of the engine is at or above said predetermined fourth value but is lower than said predetermined fifth value; and, (d) the temperature of the cooling water of the engine is below said predetermined second value, and the vehicle is not being decelerated and provided further that the following two conditions are met: that the manifold vacuum is at or above said predetermined third value and that the rotational speed of the engine is at or above said predetermined fifth value but not concurrently.

2. An air/fuel ratio control system according to claim 1, wherein said secondary air signal cutoff device feeds, instead of said corrective signal intercepted, a signal for supplying a full amount of secondary air to said secondary air supply means when the temperature of the cooling water of the engine is at or above said predetermined second value, the manifold vacuum is at or above said predetermined third value, and the rotational speed of the engine is at or above said predetermined fifth value.

3. An air/fuel ratio control system according to claim 1, wherein said secondary air signal cutoff device feeds, instead of said corrective signal intercepted, a signal for supplying a full amount of secondary air to said secondary air supply means when the temperature of the catalytic converter is within said safe temperature range, and the rotational speed of the engine is at or above said predetermined fourth value but is lower than said predetermined fifth value.

4. An air/fuel ratio control system according to claim 1, wherein said secondary air signal cutoff device feeds, instead of said corrective signal intercepted, a signal for supplying a full amount of secondary air to said secondary air supply means when the temperature of the cooling water of the engine is below said predetermined second value, and the engine is not being decelerated provided further that the following two conditions are met: that the manifold vacuum is at or above said predetermined third value and that the rotational speed of the engine is at or above said predetermined fifth value but not concurrently.

* * * * *